Nov. 23, 1965    R. D. SIBLEY    3,219,902
RESET MECHANISM FOR POWER OPERATED LOADS
Filed Aug. 26, 1960    4 Sheets-Sheet 1

INVENTOR.
RICHARD D. SIBLEY
BY
Ham and Ham
ATTORNEYS.

Nov. 23, 1965    R. D. SIBLEY    3,219,902
RESET MECHANISM FOR POWER OPERATED LOADS
Filed Aug. 26, 1960    4 Sheets-Sheet 2
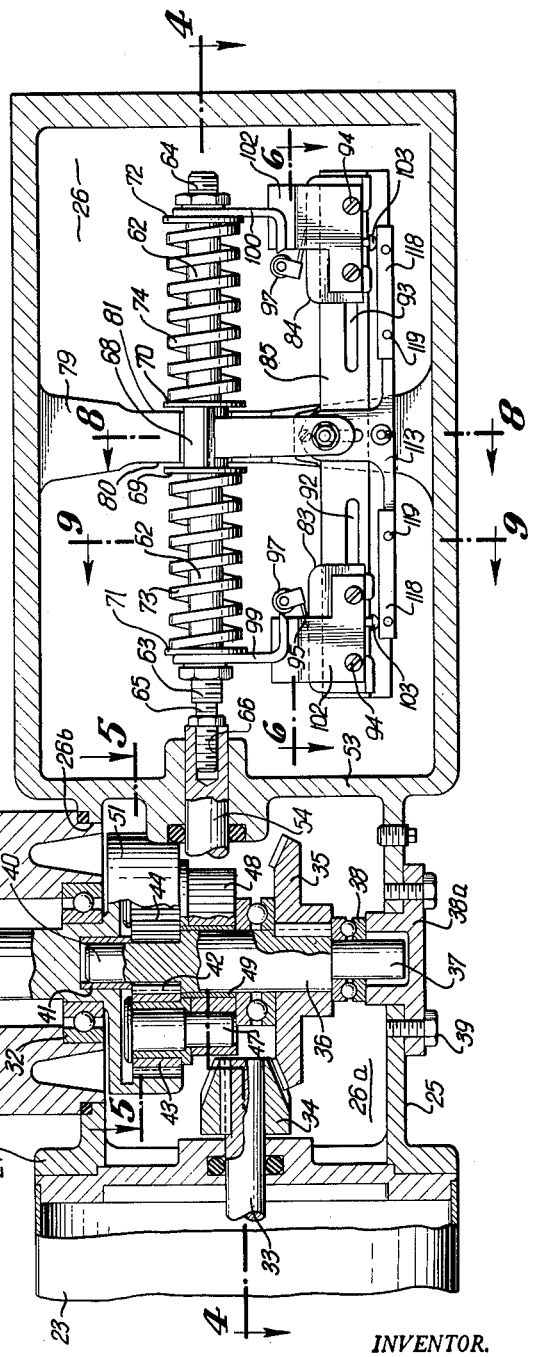
INVENTOR.
RICHARD D. SIBLEY
BY
Flam and Flam
ATTORNEYS.

Nov. 23, 1965   R. D. SIBLEY   3,219,902
RESET MECHANISM FOR POWER OPERATED LOADS
Filed Aug. 26, 1960   4 Sheets-Sheet 3
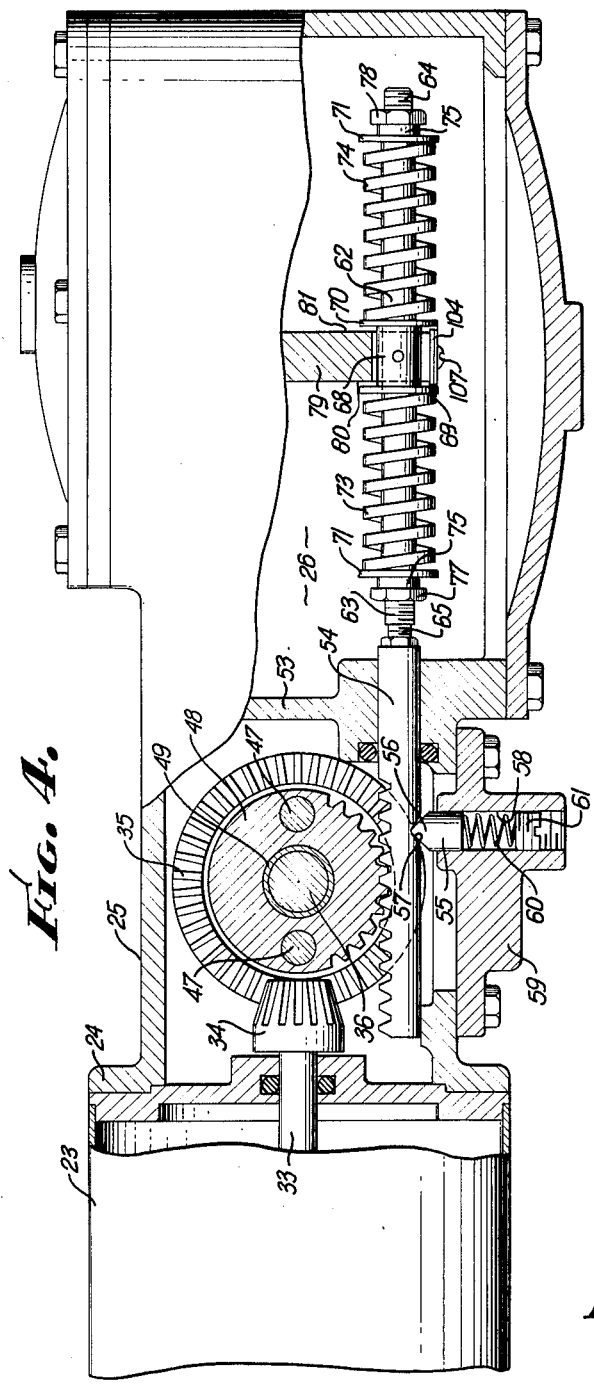
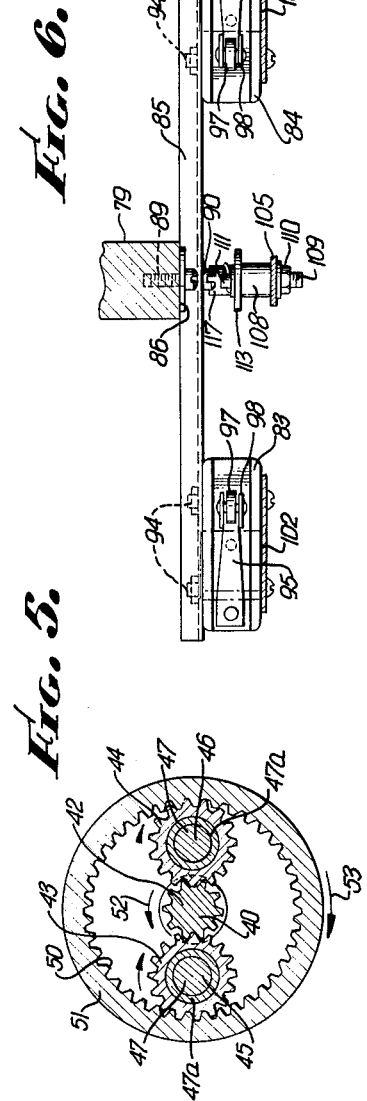
INVENTOR.
RICHARD D. SIBLEY
BY
Flam and Flam
ATTORNEYS.

Nov. 23, 1965    R. D. SIBLEY    3,219,902
RESET MECHANISM FOR POWER OPERATED LOADS
Filed Aug. 26, 1960    4 Sheets-Sheet 4

INVENTOR.
RICHARD D. SIBLEY
BY
Flam and Flam
ATTORNEYS.

United States Patent Office 3,219,902
Patented Nov. 23, 1965

3,219,902
RESET MECHANISM FOR POWER
OPERATED LOADS
Richard D. Sibley, Anaheim, Calif., assignor to International Telephone and Telegraph Corporation, Baltimore, Md., a corporation of Maryland
Filed Aug. 26, 1960, Ser. No. 52,132
8 Claims. (Cl. 318—475)

This invention relates to control of the application of power to a load that is moved optionally in either direction.

An example of such a load is a valve closure that is movable toward open or to closed positions. In gate valves the gate closure provides the load, and for relatively large sizes an electric motor is used to move the gate toward either position through a reduction gearing.

Under normal conditions of operation, the electric power continues to energize the motor until a limit switch is operated at the end of the travel of the closure in either open or closed position. It is at times desirable to shut off the power while the closure has not as yet reached its limiting position. Thus, if there should be an obstruction blocking movement of the closure, the motor is called upon to exert a torque which it may be incapable of delivering. Since the operation of the motor is often made automatically responsive to a condition, it is quite important that the motor be deenergized whenever it is called upon to exert a torque in excess of a reasonable value.

It is one of the objects of this invention to ensure that upon exerting a torque in excess of a definite value, not only will the motor be deenergized, but, in addition, any successive energization of the motor can be effected only to cause movement of the load in a reverse or "backing-off" direction.

This object is effected by the aid of circuit controllers that are "reset" so that only this backing-off operation can take place; this backing-off movement can then be initiated either automatically or manually whenever desired. Forward movement is rendered again possible only after a circuit controller is reset automatically in response to initiation of motion in the backing-off direction.

When the motor for operating the closure is energized, there is a short interval, after the motor starts, before the closure is moved. The attendant impact may cause improper operation of the circuit controllers; and, furthermore, the shock loads impose a heavy stress on the driving mechanism. It is another object of this invention to make it possible, in a simple manner, to absorb this impact.

It is still another object of this invention to improve, in general, the mechanism for power operation of reversible loads.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

FIG. 3 is an enlarged sectional view, taken along a plane corresponding to line 3—3 of FIG. 1, the apparatus being shown in a position in which the operating motor for the valve closure is deenergized;

FIG. 4 is a sectional view, taken along a plane corresponding to line 4—4 of FIG. 3;

FIG. 5 is a sectional view, taken along a plane corresponding to line 5—5 of FIG. 3;

FIG. 6 is a sectional view, taken along a plane corresponding to line 6—6 of FIG. 3;

Figure 7:
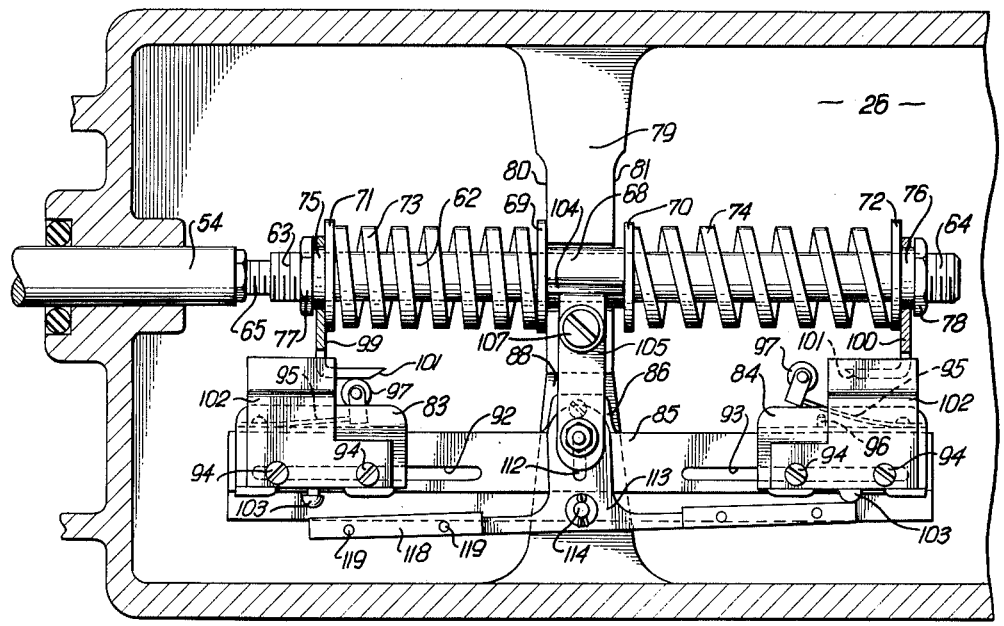
Figure 8:
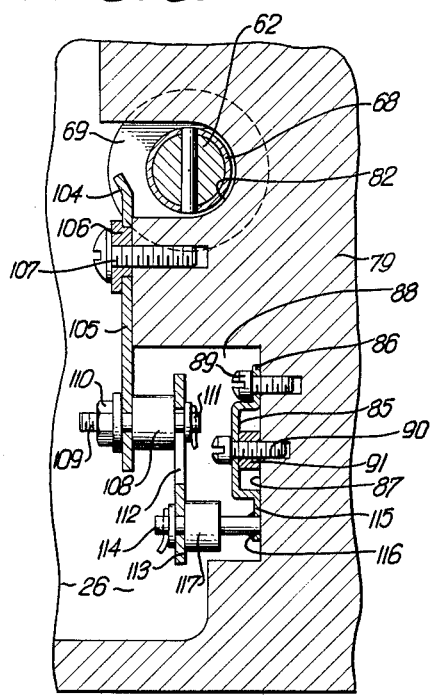
Figure 9:
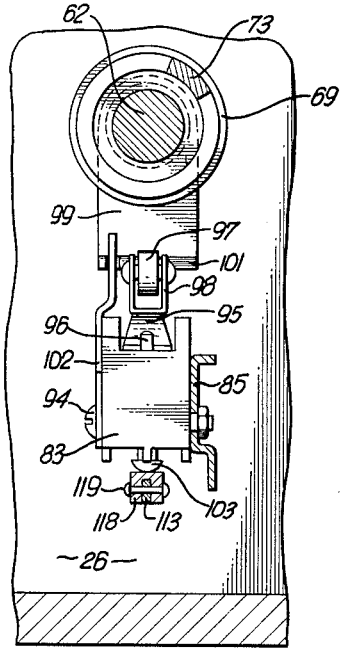

FIG. 7 is a sectional view, similar to FIG. 3, showing a position of the apparatus in which the valve is being moved to closed position; and FIGS. 8 and 9 are enlarged fragmentary sectional views, taken along the planes corresponding to lines 8—8 and 9—9 of FIG 3; and FIG. 10 is a schematic wiring diagram for the motor for operating the valve.

In the present instance, the apparatus embodying the invention is shown as incorporated in a gate valve operator. The valve closure 1 is represented diagrammatically in FIG. 2. This valve closure is intended to be moved to opening or closing positions by the aid of power mechanism. For example, a lead screw 2, operatively connected to the valve closure 1, may be caused to rise or lower by rotation of a nut 3. The lead screw 2 passes through an appropriate clearance aperture in the yoke 4 carried by the valve body. The screw also passes through the lower wall 5 of a bearing standard 6. This bearing standard 6, as well as the lower wall 5, are appropriately attached to the top of the yoke 4.

Rotatably mounted in the standard 6 is a hollow shaft 7. The lower portion of this shaft rests upon the wall 5; and the recess 8 thereof is made hexagonal so as to fit the nut 3. Accordingly, upon rotation of the hollow shaft 7, the nut 3 is rotated. Since the lead screw 2 is restrained by virtue of the valve structure against rotation, the valve closure 1 moves either upwardly or downwardly, depending upon the direction of rotation of the shaft 7 and of nut 3.

Figure 1:
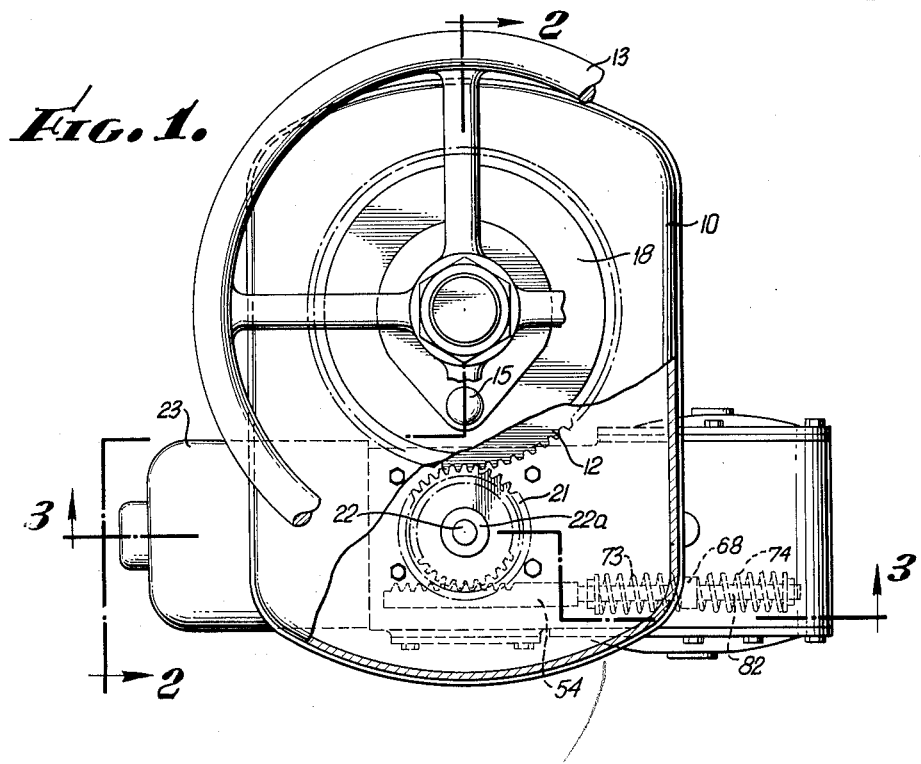
FIGURE 1 is a plan view, partly broken away, of a valve-operating apparatus incorporating the invention.
Figure 2:
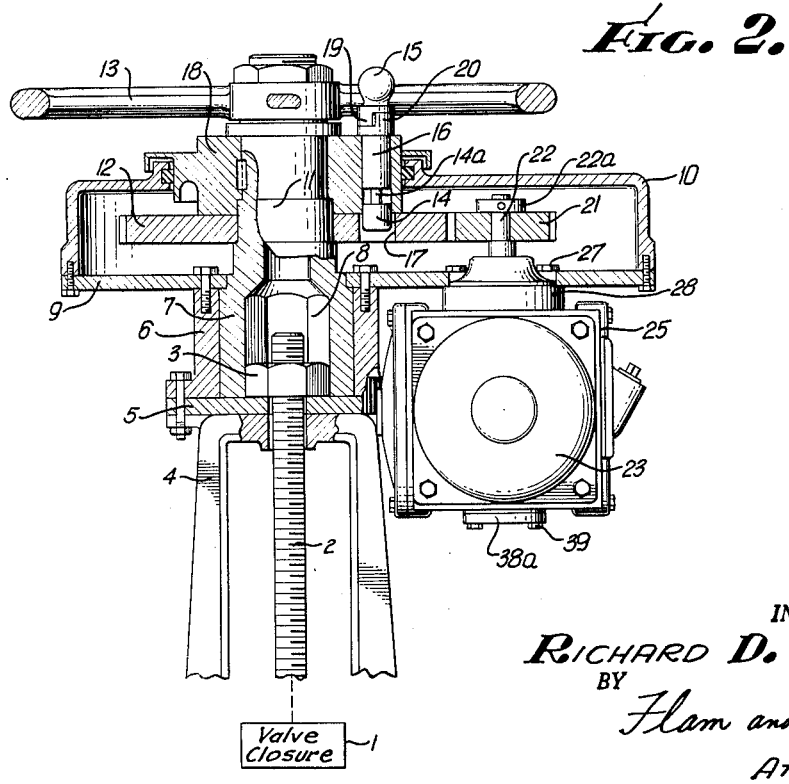
FIG. 2 is a sectional view, taken along a plane corresponding to line 2—2 of FIG. 1.

The shaft 7 extends through the lower wall 9 of a casing 10 (see also FIG. 1). This wall overlies a shoulder formed on the shaft, and is attached by any appropriate means to the top of the bearing standard 6. Surrounding the reduced portion 11 of the shaft 7 is a gear wheel 12 (FIGS. 1, 2 and 3). This gear wheel, as hereinafter described, is used to drive shaft 7, and thereby to operate valve closure 1. Mounted on top of the shaft 7 is a handwheel 13 which may alternatively be used to rotate the shaft 7 without the aid of power. This handwheel is keyed to a collar 18, which in turn is releasably connected to gear 12. Thus, the torque imparted to gear 12 may serve to drive collar 18, which in turn drives shaft 11. An axially movable coupling pin 14 has a shank 14a mounted in collar 18 and guided by a sleeve 16. Pin 14 engages in an aperture 17 in the gear wheel 12, thereby coupling the gear wheel to the collar 18.

When it is desired to uncouple the shaft 7 from the wheel 12, the knob 15, mounted on top of shank 14a, is pulled upwardly so as to move the pin 14 out of the aperture 17. The knob 15 may be maintained in the pulled-up position by rotating the knob 15 so that the lower portion 19 of the knob 15 rests on the upper surface of the enlarged head 20 of guide sleeve 16. The surface of head 20 is stepped to conform to the lower stepped surface of knob 15, whereby it is possible to nest the two parts 19 and 20 so that the pin 14 is in the coupling position shown in FIG. 2.

For power driving the shaft 7, use is made of a pinion 21 (FIGS. 1, 2 and 3).

As indicated most clearly in FIG. 3, the pinion 21 is mounted upon the upper end of a shaft 22 which, in a manner to be hereinafter described, is driven by an electric motor 23 (FIGS. 1, 3 and 4).

As shown most clearly in FIGS. 2, 3 and 4, the electric motor is conveniently mounted upon a flange 24 at the left hand of the casing 25. Casing 25 is of generally rectangular section. A wall 53 (FIG. 3) forms a right hand space or chamber 26 housing some of the control elements. Furthermore, an intermediate space or chamber 26a is located between the flange 24 and wall 53. This space provides a housing for gearing. Its upper opening 26b receives the lower end of a hollow post 28. This hollow post may be attached to the top of casing 25 in any convenient manner. At its upper end, the post 28 is provided with a bearing 29 for the power driven shaft 22. A packing 30 is also accommodated by the post 28. The post 28 is provided with a shoulder 28a accommodating the edge of an aperture 9a in the base 9. Appropriate bolts 27 in a convenient way serve to fasten the post 28 to the base 9. In this manner the casing 25 and its contents are suspended below the housing 10.

Shaft 22 is keyed to the pinion 21 (FIG. 3), and has a collar 22a to restrict axial movement of the pinion.

A lower enlarged portion 31 of the shaft 22 is similarly rotatably supported by the aid of the ball bearing structure 32 mounted in the lower end of the post 28.

The gearing for connecting the motor 23 to the shaft 22 can best be described in connection with FIGS. 3, 4 and 5.

Thus, the motor 23 has a shaft 33 operating a bevel pinion 34 located in chamber 26a. This bevel pinion serves to drive a bevel gear 35 mounted on a shaft 36. This shaft 36 has a reduced lower end 37 for mounting a thrust bearing 38 supported between the lower end of the bevel gear 35 and the upper surface of a cover member 38a. This cover member 38a is hollow for the passage of the lower end of the shaft 37 and is fastened as by the aid of bolts 39 to the lower surface of the casing 25.

The upper end of the shaft 36 has a reduced portion 40 which is piloted in a bearing bushing 41 located in an axial aperture in the lower end of the shaft 31.

The upper end 40 of shaft 36 carries a pinion 42 (see particularly FIG. 5). This pinion 42 drives a pair of intermediate planetary pinions 43 and 44. The axes 45 and 46 of these pinions may for the present be considered as stationary. These pinions are mounted on stub shafts 47 that are rotatably mounted in turn upon a mutilated spur gear 48 (FIG. 4). The spur gear 48 has a bearing bushing 49 and is mounted for free rotation on the shaft 36. Shafts 47 may conveniently be journalled in bushings 47a mounted in pinions 43, 44.

As hereinafter explained, mutilated spur gear 48 is angularly moved only through a relatively small extent and accordingly, for the present we may assume that the gear 48 is stationary.

The pinions 43 and 44 mesh with the internal teeth 50 of a flange 51 integrally mounted on the lower end of the shaft 31. Accordingly, the drive from the bevel pinion 34 to the pinion 21 is accomplished through the bevel gear 35, shaft 36, pinion 42, pinions 43 and 44, flange 51 and shaft 31 (its upper end 22 being in keyed relation to gear 21).

When it is desired to rotate the gear wheel 12 so as to move the valve closure 1 toward fully open position, the pinion 42 is rotated in a counterclockwise direction as indicated by arrow 52 (FIG. 5). The pinions 43 and 44 then rotate in a clockwise direction, and the flange 51 will also rotate in a clockwise direction as indicated by arrow 53.

A resilient restraint (FIG. 4) is imposed against the rotation of the mutilated gear 48. Thus, in the wall 53 is slidably mounted a rack bar 54. This rack bar 54 has teeth in engagement with the teeth of gear 48. The rack bar 54 is restrained against axial movement by the aid of a pin 55 having a tapered point 56 engaging a correspondingly shaped recess 57 in the lower surface of rack bar 54. This pin 55 is longitudinally slidable in an aperture 58 of a cover member 59 attached to the lower side of the casing 25. A compression spring 60 urges the pin 55 into engaging position. The degree of compression of the spring and the corresponding force urging the pin 55 inwardly are obtainable by the aid of an adjustable headless screw 61 threaded into the lower end of the aperture 58. By adjustment of the headless screw 61, the amount of the force that tends to move the bar 54 longitudinally, and required to move the pin 55 outwardly of the recess 57 may be adjusted.

When the motor 23 is energized from standstill it is subjected to a shock load when the nut 3 is moved. This shock load causes the pin 55 to be moved at least partially outwardly of the recess 57. Upon sufficient exertion of torque on the load represented by the nut 3, and the valve closure 1, the pin 55 is moved entirely out of the recess against the force of the spring 60. The bar 54 may then move to the right or left depending upon the direction of rotation of the flange 51 (FIG. 5). To effect an opening movement, the flange 51 moves in a clockwise direction tending to move the bar 54 toward the left; conversely, when motor 23 is energized to move the gate valve 1 toward closing position, the bar 54 is moved toward the right.

Upon the exertion of a torque beyond a definite amount for either direction of motion, the motor 23 is deenergized by the aid of a mechanism now to be described.

The bar 54 is joined to an extension rod 62. This rod 62 has threaded ends 63, 64. At threaded end 63 a reduced threaded end 65 is used to join the rod 62 to the bar 54, as by engaging a threaded aperture 66 (FIG. 3) in the right hand end of the bar 54.

At the central portion of the rod 62, there is a short sleeve 68. This sleeve is attached to rod 62. On either side of the sleeve is a compression spring 73 or 74. These springs are made of relatively heavy rectangular material (see FIG. 9). The sleeve 68 serves as one element to form an abutment against which the adjacent ends of springs 73 and 74 may engage. Thus in the inactive position of FIG. 7, each end of the sleeve is engaged by a washer 69 or 70, urged against the sleeve ends by the springs 73 and 74.

Washers 71 and 72 mounted near the ends of rod 62 serve with washers 69 and 70, to define an axial space in which compression springs 73 and 74 may be placed.

The washers 71 and 72 are maintained against outward movement under the pressure of the springs 73 and 74, by the aid of sleeves or collars 75 and 76. These sleeves are held against outward movement by the elastic stop nuts 77 and 78 on threaded ends 63 and 64. In the inactive position of FIGS. 3 and 4, the inner washers 69 and 70 are held apart by sleeve 68 to be symmetrically spaced from the side surfaces 80 and 81 of a central bracket 79. The sleeve 68 is long enough to maintain the washers 69 and 70 out of contact with the surfaces 80 and 81. By the adjustment of the rod 62 with respect to bar 54, these equal slight clearances can be maintained between the washers 69 and 70 and the abutment surfaces 80 and 81. This adjustment is rendered simple by use of the threaded end 65 of rod 62.

Upon an exertion of torque in the closing direction, the rod 62 moves to the right. At the very beginning of this motion, the washer 69 contacts the surface 80 (FIG. 7).

The bracket 79 is provided with an open recess 82 (FIG. 8) into which the sleeve 68 may enter and which however, is narrow enough so that the outer peripheries of the washers 69 and 70 may engage the surfaces 80 and 81 respectively.

When the motor 23 is thus operating in a direction to close the valve, the bar 54 as shown in FIG. 4 is urged toward the right against the resilient restraint imposed by the pin 55. The spring 73 is compressed since the washer 69 is urged against the surface 80. After the initial compression to bring the washer 69 into the position of FIG. 7, the spring 73 is further compressed as additional torque is required. The spring 74 is however unaffected, the washer 70 being urged by spring 74 against the right hand surface of the sleeve 68, and the right hand end of spring 74 being abutted against washer 72.

When the apparatus is used to move the valve closure toward open direction, a similar action takes place, the rod 62 being moved toward the left, and spring 74 being compressed.

The degree of compression of the spring 73 or 74 is dependent upon the torque exerted by the motor 23 in one or the other direction. When this torque exceeds a desired limit, one or the other of the circuit controllers 83 and 84 (FIGS. 6, 7, and 9) is operated. As shown most clearly in FIGS. 6 and 9, these switches are supported on a bracket 85 having a central ear 86 (see also FIG. 8) offset from the main body of the bracket and attached to the inner wall 87 of a recess 88 formed in the bracket 79, by the screw 89. Another screw 90 immediately below the screw 89 passes through an appropriate aperture in the bracket 85 as well as through a spacer 91 for engagement with a threaded hole in the bracket 79.

The two oppositely extending arms of the bracket 85 are provided with slots 92 and 93 through which the screws or bolts 94 may pass for attaching the circuit controllers 83 and 84. By the aid of these slots 92 and 93, it is possible to adjust the position of these switches 83 and 84 so as to determine at which degree of compression of springs 73 or 74 the circuit controller may be operated.

For operating the circuit controllers, a spring arm such as 95 (FIGS. 7 and 9) is incorporated in the respective circuit controller. It is so mounted that when it is depressed it serves to depress the post 96. Once depressed, the circuit controller will stay in the position to which it is urged until reset. In the present instance the arm 95 is arranged to be flexed by depression of a roller 97 mounted in a U-shaped bearing standard 98 carried by the free end of the resilient arm 95. Since details of such circuit controllers are now well known, further description thereof is considered unnecessary.

In order to operate either of the switches 83 or 84 in response to the compression of the spring 73 or the corresponding compression of the spring 74, use is made of a pair of L-shaped cam members 99 and 100. Each of these cam members has a horizontal arm ending in a sloping cam face 101 adapted to cooperate with the corresponding roller 97 for depressing the arm 95. The cam members 99 and 100 are respectively mounted on the sleeves 75 and 76 with slight clearance so as to permit adjustment of rod 62 without any bending effect upon the members 99 and 100.

Guide plates 102 are mounted alongside the front of each of the switches 83 and 84, and extend above these switches (FIG. 9). An appropriate slot is provided in the horizontal portion of each of the members 99 and 100 to cause the horizontal portion of these members 99 and 100 to straddle the upper portion of these guide plates. These guide plates thus limit these cam members 99 and 100 against material misalignment with respect to the rollers 97.

Just as soon as the clearance between the washers 69 and surface 80 is taken up by rightward movement of the rod 73, while the motor 23 is energized to close the valve, the switch 84 is reset so as to cause it to move to a position conditioning the reverse operation of the motor 23. For this purpose a reset button 103 is arranged projecting from the lower surface of each of the switches 83 and 84. This reset is effected by the action of the washer 69 on the upper portion 104 of a lever 105 (FIGS. 7, 8 and 9). This lever 105 is pivotally mounted upon a disk-like member 106. This member is eccentrically mounted on a mounting screw 107. The screw 107 is threaded into the bracket 79, and passes through member 106. The eccentric arrangement is provided to adjust the effective length of the lever 105.

The lower end of the lever 105 carries a spacer member 108. This spacer member 108 has a threaded stem 109 which passes through an appropriate aperture in the lever 105 and is held in place by the aid of the nut 110.

The right hand end of this spacer 108 carries a pin 111 which engages an elongated slot 112 in a reset lever 113. This reset lever 113 is pivotally mounted on a pin 114. This pin 114 is fixed in a stationary manner on a downwardly projecting portion 115 of the bracket 85, as for example, by the aid of a solder 116. The pin 114 carries an integral enlarged portion 117 against which the lever 113 may rest.

Each of the operating arms of the lever 113 is provided with an overlay of insulation material 118 appropriately held in place by the aid of rivets 119. This insulation member is grooved to permit the entry of the lever 113 as shown most clearly in FIG. 9.

The end of the lever is intended to engage either one of the reset buttons 103 for operating the corresponding circuit controller. For the position shown in FIG. 7, the circuit controller 84 has been reset by the lever 113.

Should the torque by the motor 23 be exerted in a direction tending to move the rod 62 toward the left, then the spring 73 remains uncompressed and spring 74 is compressed against the washer 70 as soon as it comes into contact with the stop surface or abutment 81. This movement of the sleeve 68 toward the left permitting such contact to take place causes the lever 113 to be moved in a clockwise direction and to reset the switch 83 by the aid of its button 103. Exertion of a continued increasing torque will of course cause compression of the spring 74 to open the circuit for the motor 23. However, since the oppositely directed switch 83 has been reset, the circuit for energizing the motor 23 is conditioned for operation for backing off.

Of course, the same action takes place upon closing action of motor 23, causing spring 73 to be compressed.

The diagram of FIG. 10 illustrates one of many types of circuits capable of being controlled by switches 83 and 84 for resetting the motor 23 for reverse operation. The energization of motor 23 in either direction is impossible without closing one of the circuit controllers 120 and 121. The switches 83 and 84 effect such connections by causing either of these switches to operate to deenergize the motor 23 whenever an excessive torque resistance in one direction is encountered. The circuit controllers 120 and 121 are indicated as operated electromagnetically, by operation of switches 83 and 84.

The control circuits 122 (shown only by a block diagram) are arranged to complete the motor circuit for either direction of motion, and depending upon which of the two circuit controllers 120 or 121 is closed.

By the aid of the present invention, when the rod 62 moves even slightly, one of the switches 120 or 121 is operated to condition a motor circuit, in order to make it possible by aid of the circuits 122 to operate the motor 23 in the opposite direction.

The inventor claims:

1. In a power drive for a reversible load; a reversible motor; a transmission mechanism operated by the motor and driving the load; a pair of circuit controllers each having two stable states; means forming an energization circuit for forward operation of the motor and dependent upon one of said circuit controllers being in one of its states; means forming an energization circuit for reverse operation of the motor and dependent upon the other of said circuit controllers being in one of its states; means responsive to torque exerted by the motor when operating in a forward direction for switching said other circuit controller back to its said one state, and upon the existence of a predetermined torque to switch said one circuit controller away from its said one state and into a second state; and means responsive to torque exerted by the motor in a reverse direction for switching said one circuit controller back to its said one state, and upon the existence of a predetermined torque to switch said other circuit controller away from its said one state and into a second state.

2. The combination as set forth in claim 1, with the provision of means to absorb the shock when the motor is started.

3. In a power drive for a reversible load: electric motor means for moving a load in a forward and reverse direction; a member guided for movement in a path; means determining a central neutral position of the member in which said member has a limited range of movement; means sensing the torque load of said motor for exerting a force upon said member corresponding in magnitude and direction to the magnitude and direction of said torque load; first spring means operable after movement of the member in one direction from beyond said neutral stable position for increasingly opposing movement of said member in said one direction; second spring means operable after movement of the member in the other direction beyond said central neutral position for increasingly opposing movement of said member in said other direction; a first switching means having alternate stable states; means forming a forward energization circuit for said motor means and dependent upon the first switching means being in one of its states; movement of said motor means in the forward direction exerting a torque tending to move said member in said one direction; a second switching means having alternate stable states; means forming a reverse energization circuit for said motor means and dependent upon the second switching means being in one of its states; movement of said motor means in the reverse direction exerting a torque tending to move said member in said other direction; linkage means responsive to initial movement of said member in said one direction and in said limited range for moving said second switching means to its said one state, and responsive to initial movement of said member in said other direction in said limited range for moving said first switching means to its said one state; switch engaging means operative upon predetermined movement of said member in one direction beyond said neutral range for moving said first switching means to its other state, and upon predetermined movement of said member in the other direction beyond said neutral range for moving said second switching means to its other state.

4. In a power drive for a reversible load: electric motor means for moving a load in a forward and a reverse direction; a support member; a torque member guided for movement relative to said support member; means determining a normal central position of the torque sensing member in which said torque member has a limited range of movement; means sensing the torque load of said motor for exerting a force upon said torque member corresponding in magnitude and direction to the magnitude and direction of said torque load; spring means supported on one of said members; abutment means formed on the other of said members and engageable with the spring means only after movement of said torque member beyond said range in one direction for increasing opposition to the movement of said torque member; switching means having two stable plates; means forming a forward energization circuit for said motor means and dependent upon said switching means being in one of its states; energization of said motor means for movement in the forward direction exerting a torque tending to move said torque member in one direction and energization of said motor means for movement in the reverse direction exerting a torque tending to move said torque member in the other direction; means engaging said switching means and operative upon predetermined movement of said torque member in said one direction for moving said switching means from its said one state to the other of its said states; and linkage means operated upon initial movement of said torque member in the other direction in its said limited range for moving said switching means from its said other state to said one state.

5. In a power drive for a reversible load: electric motor means for moving a load in a forward and a reverse direction; a support member; a torque member guided for movement relative to said support member; means determining a normal central position of the torque sensing member in which said torque member has a limited range of movement; means sensing the torque load of said motor for exerting a force upon said torque member corresponding in magnitude and direction to the magnitude and direction of said torque load; first spring means supported on one of said members; abutment means formed on the other of said members and engageable with the said first spring means only after movement of said torque member beyond said range in one direction for increasing opposition to the movement of said torque member; first switching means having alternate stable states and having first and second actuators respectively for moving said switching means from one of its states to the other of its states, and from the said other of its states to its said one state; means forming a forward energization circuit for said motor means and dependent upon said first switching means being in its said one state; energization of said motor means for movement in the forward direction exerting a torque tending to move said torque member in said one direction; means engaging said first of said actuators of said first switching means after predetermined movement of said torque member in said one direction against the force of said first spring means; linkage means operated upon initial movement of said torque member in the other direction in said range for engaging the said second of said actuators of said first switching means; second spring means supported on one of said members; abutment means formed on the other of said members and engageable with the said second spring means only after movement of said torque member beyond said range in the other direction for increasing opposition to the movement of said torque member; second switching means having alternate stable states and first and second actuators respectively for moving said switching means from one of its states to the other of its states, and from the said other of its states to its said one state; means forming a reverse energization circuit for said motor means and dependent upon said second switching means being in its said one state; energization of said motor means for movement in the forward direction exerting a torque tending to move said torque member in said other direction; means engaging said first of said actuators of said second switching means after predetermined movement of said torque member in said other direction against the force of said second spring means; and linkage means operated upon initial movement of said torque member in the said one direction in said range for engaging the said second of said actuators of said second switching means.

6. The combination as set forth in claim 5 together with resilient means for centering said rod in said neutral range and yielding upon the existence of a predetermined thrust upon said torque member.

7. The combination as set forth in claim 5 in which the torque member comprises a rod, in which the support member has an aperture surrounding the central portion of the rod to form said abutments, in which the spring means surround opposite ends of the rod with their inner ends positioned to be engaged by the support member after initial movement of the rod from said central position; and in which said rod carries means movable therewith to operate first actuators of the respective switching means.

8. The combination as set forth in claim 7 in which the linkage means includes a lever pivoted to the support member and connected to the center of the rod for swinging movement of the lever, the lever having parts engageable with the second actuators of the respective switching means.

(Other references on following page)

References Cited by the Examiner

UNITED STATES PATENTS

| | | | |
|---|---|---|---|
| 2,005,891 | 6/1935 | Elberty | 318—475 X |
| 2,387,047 | 10/1945 | Weiss | 318—475 X |
| 2,409,132 | 10/1946 | Lear | 318—469 X |
| 2,566,720 | 9/1951 | Dissinger | 200—76 |
| 2,600,568 | 6/1952 | Nelson | 318—475 X |
| 2,901,076 | 8/1959 | Dean | 318—475 X |

ORIS L. RADER, *Primary Examiner.*